Feb. 3, 1931.  G. W. PIKE  1,791,084
ARTIFICIAL BAIT
Filed Dec. 14, 1927
Fig. 1.
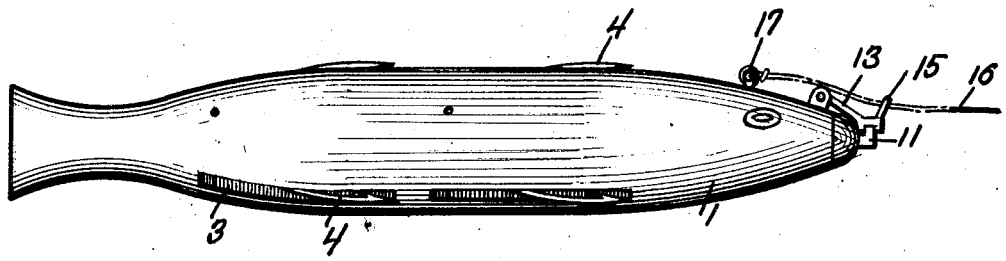
Fig. 2.
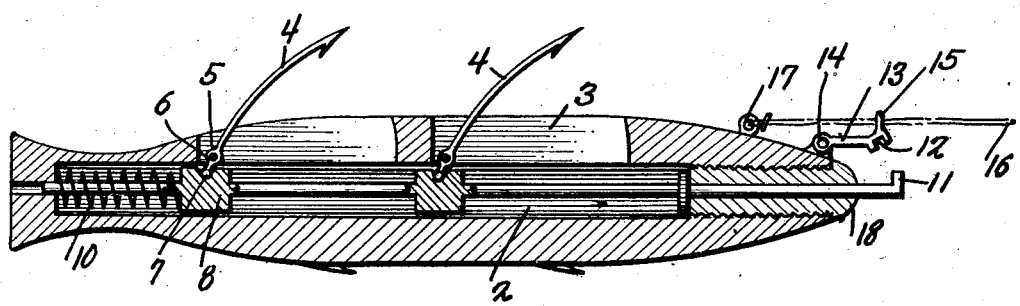
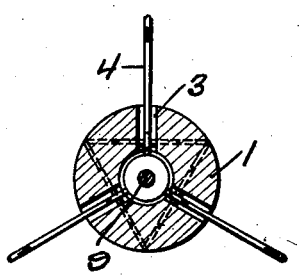
Fig. 3.
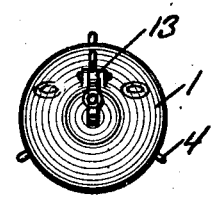
Fig. 4.
G. W. Pike, INVENTOR.

Patented Feb. 3, 1931

1,791,084

UNITED STATES PATENT OFFICE

GEORGE W. PIKE, OF PHOENIX, ARIZONA

ARTIFICIAL BAIT

Application filed December 14, 1927. Serial No. 240,001.

This invention relates to an artificial bait and has for its primary object a construction having the exterior appearance of a fish and housing therein automatically operating mechanism for bringing about a positive engagement between the hooks of the bait and the mouth of the fish.

An object of the invention is the novel manner of constructing and arranging the hook mechanism interiorly of the lure for instant projection of the hooks exteriorly of the lure when the latter is subjected to a pull by a biting fish.

Another object of the invention is the novel manner of mounting and associating the hooks with the lure so as to be completely housed within the lure but capable of instant projection beyond the exterior surface of the lure for bringing about an instant engagement of the hooks with the mouth of the fish.

Besides the above, my invention is distinguished in the novel manner of connecting and associating the various parts so that when the line is subject to a predetermined pull a trigger will be automatically released to allow mechanism to function to throw a plurality of hooks to an active position.

With these and other objects in view, the invention will be better understood from the following detailed description taken in connection with the accompanying drawings, wherein:

Figure 1 is a side elevation of the artificial bait,

Figure 2 is a longitudinal sectional view,

Figure 3 is a cross sectional view, and

Figure 4 is an end elevation.

Again referring to the drawings illustrating one of the many constructions of my invention, the numeral 1 designates a lure of any suitable design illustrated in the form of a minnow to attract fish thereto. This lure 1 is provided with a cylindrical bore 2 and a plurality of slots 3 communicating with the bore and establishing communication between the exterior of the lure and the interior thereof to accommodate the shanks of the hooks 4. Each hook 4 is pivotally mounted in a respective one of the slots as indicated at 5, so as to be capable of swinging into position interiorly or exteriorly of the lure, the former being an inactive position and the latter to an active position. The hooks are preferably arranged in groups, and each hook is further provided with finger 6 operatively engaged in a respective one of a plurality of recesses 7 in a respective one of two slides 8 so that in the movement of the slides in one direction or the other, the hooks will be automatically thrown to an active or inactive position. To accomplish this desired result the slides are connected together by a stem 9 about one end of which is arranged a coil spring 10 abutting one of the slides so as to be compressed in the movement of the slide in one direction and to function to propel the slides in the opposite direction when released in a manner now to be described.

The stem 9 terminates in a lug 11 engageable in a notch 12 in a trigger 13. This trigger 13 is pivotally connected to the lure as indicated at 14 so that the trigger may swing toward and away from the stem to bring about engagement between the walls of the notch 12 and the lug 11. When this has been accomplished the stem and associated slides are positively held against movement but when the trigger is moved out of engagement with the lug 11 the spring 10 will be free to function to forcibly shift the stem 9 and the slides in a direction for immediately projecting the hooks to an operative position. To accommodate these results automatically, the trigger is provided with an eye 15 through which passes the line 16 that is secured to the lure through the connection 17. Particular attention is called to the fact that the angular relation of the trigger, lug 11 and connection 17 is such, as to flex the line 16, with the result that when the line is subject to a pull the trigger will be automatically thrown to a releasing position.

To complete the invention I mount a plug 18 in one end of the bore 2 for slidably supporting the stem 9 and retaining the same within the bore.

From the foregoing description taken in connection with the accompanying drawings, it will be appreciated that I have constructed an artificial bait having unique features in which the hook mechanism is completely housed within the lure but capable of instant projection to an active position upon the lure being subjected to a pull. It will also be appreciated that this compact arrangement of the component parts enables the lure to readily travel through the water or obstructions in the water.

It is of course, to be understood, that the lure may be constructed in various other configurations and the hooks may be mounted therein in various other manners and besides various types of mechanism may be utilized for throwing the hooks to active position and therefore, I do not desire to be limited in protection in any manner whatsoever except as set forth in the following claim.

What I claim is:

An artificial bait comprising a lure, a movable hook on said lure, a hook-operating mechanism carried by said lure including an upstanding lug beyond the front end of said lure, a trigger pivotally mounted upon the head of said lure and extending forwardly therebeyond, the trigger having a notch for engagement with said lug, means upon the lure in the rear of said trigger for the connection of a fishing line, and a guide upon the free end of the trigger with which the line may coact whereby to provide for actuation of the trigger upon tensioning of the line, as and for the purposes set forth.

In testimony whereof I affix my signature.

GEORGE W. PIKE.